(12) United States Patent
Tran et al.

(10) Patent No.: US 10,507,721 B2
(45) Date of Patent: Dec. 17, 2019

(54) CLOSURE UNIT, METHOD FOR DETECTING DEFECTIVE CLOSURE FLAPS OF A CLOSURE UNIT AND MOTOR VEHICLE

(71) Applicant: VALEO KLIMASYSTEME GMBH, Bad Rodach (DE)

(72) Inventors: Vincent Tran, Bietigheim-Bissingen (DE); Bernd Noatsch, Bietigheim-Bissingen (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 0 days.

(21) Appl. No.: 16/041,004

(22) Filed: Jul. 20, 2018

(65) Prior Publication Data
US 2019/0023121 A1   Jan. 24, 2019

(30) Foreign Application Priority Data
Jul. 24, 2017 (DE) .................. 10 2017 116 646

(51) Int. Cl.
*B60K 11/08* (2006.01)
*G07C 5/08* (2006.01)

(52) U.S. Cl.
CPC .......... *B60K 11/085* (2013.01); *G07C 5/0808* (2013.01)

(58) Field of Classification Search
CPC .................................................. B60K 11/085
See application file for complete search history.

(56) References Cited

U.S. PATENT DOCUMENTS

| | | | |
|---|---|---|---|
| 8,752,886 B2* | 6/2014 | Wirth ................... | B60K 11/085 180/68.6 |
| 9,758,031 B2* | 9/2017 | Edwards .............. | B60K 11/085 |
| 9,810,138 B2* | 11/2017 | Solazzo ............... | B60K 11/085 |
| 9,914,351 B2* | 3/2018 | Kim ..................... | B60K 11/085 |
| 10,118,480 B2* | 11/2018 | Yasui .................... | B60K 11/04 |
| 10,166,858 B2* | 1/2019 | Ibanez Moreira ... | B60K 11/085 |
| 2010/0243351 A1* | 9/2010 | Sakai ................... | B60K 11/085 180/68.1 |
| 2015/0020758 A1* | 1/2015 | Hosono ................ | B60K 11/085 123/41.04 |
| 2015/0159541 A1* | 6/2015 | Solazzo ............... | B60K 11/085 73/114.68 |
| 2017/0203649 A1* | 7/2017 | Jakobs ................. | B60K 11/085 |
| 2019/0061515 A1* | 2/2019 | Jeong ................... | B60K 11/085 |

* cited by examiner

*Primary Examiner* — Brian L Swenson
(74) *Attorney, Agent, or Firm* — Osha Liang LLP

(57) ABSTRACT

There is described a closure unit (14) for an air inlet of a motor vehicle which comprises three closure flaps (18, 22, 26) which can be pivoted about a rotation axis (16, 20, 24). In a closed position, the closure flaps (18, 22, 26) close the air inlet and a closure flap which is referred to as a second closure flap (22) abuts a closed position stop (36). In an open position, the closure flaps (18, 22, 26) release the air inlet and a closure flap which is referred to as the third closure flap (26) abuts an open position stop (40). Furthermore, a method for detecting defective closure flaps (18, 22, 26) of such a closure unit (14) is explained. Furthermore, a motor vehicle having one or more air inlets is presented, wherein at least one of the air inlets is provided with such a closure unit (14).

15 Claims, 4 Drawing Sheets

Figure 1:
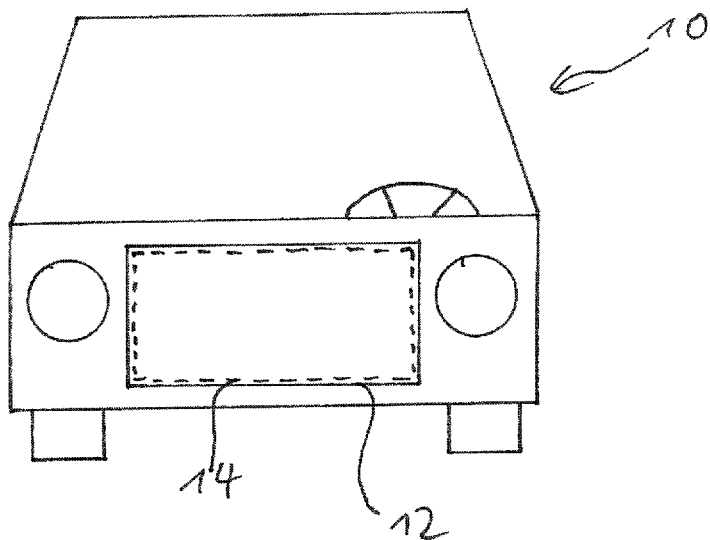
Figure 1:
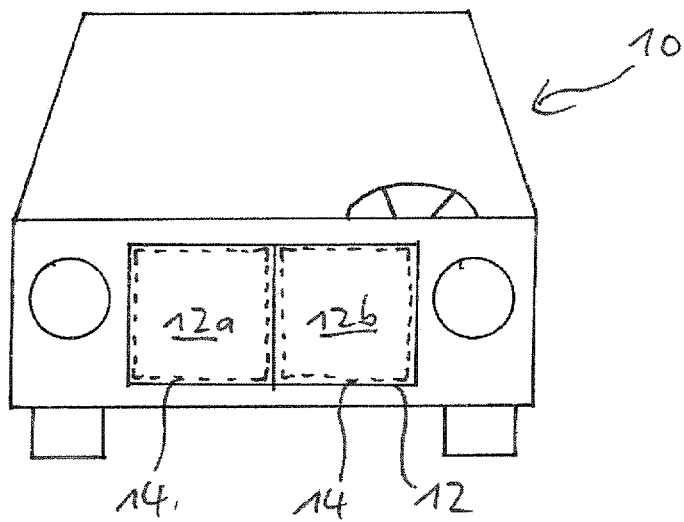

CLOSURE UNIT, METHOD FOR DETECTING DEFECTIVE CLOSURE FLAPS OF A CLOSURE UNIT AND MOTOR VEHICLE

The invention relates to a closure unit for an air inlet of a motor vehicle and a method for detecting defective closure flaps of such a closure unit.

In addition, the invention relates to a motor vehicle having one or more air inlets.

Closure units for air inlets are known from the prior art. The same applies to motor vehicles having at least one air inlet, wherein the air inlet is provided with a closure unit.

Air inlets are in this instance inlets which are used to supply ambient air to cooling devices of the motor vehicle. The cooling devices in turn are used primarily to cool a drive motor of the motor vehicle.

In colloquial terms, in this context an air inlet which is arranged in a front region of the motor vehicle in the travel direction is also referred to as a radiator grille. However, the invention is not limited to such air inlets. For example, air inlets which are arranged laterally on a motor vehicle can also be provided with closure units. This may be the case for motor vehicles having a rear or central motor.

Using known closure units, an associated air inlet can be either closed or released in terms of flow. In the released state, ambient air, also referred to colloquially as travel wind, can flow through the air inlet to the cooling device. In the closed state, the ambient air cannot pass through the air inlet and therefore has to flow past the motor vehicle at the outer side.

Closure units are used in the prior art for different reasons.

Firstly, the air resistance of a motor vehicle is reduced when an air inlet is provided with a closure unit and this is in the closed state. Consequently, the fuel consumption and consequently also the emissions of the motor vehicle are reduced. This applies in particular to the $CO_2$ emission.

Furthermore, the cooling action of a cooling unit which is supplied or subjected to flow via the associated air inlet can be actively influenced via a closure unit. Thus, in particular during a cold start of a drive motor of the motor vehicle, it may be advantageous to move the closure unit into the closed state so that components of the drive motor become heated more quickly, that is to say, reach their preferred operating temperature more quickly. Consequently, the degree of efficiency of the drive motor can be influenced in a positive manner. Consequently, exhaust gas cleaning systems also reach their operating temperature more quickly so that on the whole the pollutant emission is reduced. Consequently, as a result of this effect, the $CO_2$ balance of the motor vehicle can also be improved.

The presence of the advantages mentioned always requires the functionality of the closure unit. In the event that there is a defect or a malfunction in the region of the closure unit, the advantages are not or are only partially present. In this instance, it is advisable to identify and overcome the cause of the defect or the malfunction as quickly as possible. This can take place, for example, via a visual control which can be carried out in the context of a regular inspection of the motor vehicle. Known methods for detecting defective closure units, in particular for detecting defective closure flaps of the closure units, are thus generally carried out by means of technical operators, for example, in a workshop.

An object of the invention is therefore to provide a closure unit in which malfunctions and defects which may occur can be identified in a simple and rapid manner. To this end, a method for detecting defective closure flaps of a closure unit is further intended to be set out, by means of which method defects and malfunctions can be identified in a simple, rapid and reliable manner. Furthermore, a motor vehicle which is provided with such a closure unit is intended to be described.

The object is achieved with a closure unit of the type mentioned in the introduction having a first closure flap which can be pivoted about a first rotation axis, a second closure flap which can be pivoted about a second rotation axis, a third closure flap which can be pivoted about a third rotation axis, a first coupling member via which the first closure flap and the second closure flap are kinematically coupled, a second coupling member via which the first closure flap and the third closure flap are kinematically coupled and a drive unit which is drivingly coupled to the first closure flap and which is constructed to move the closure flaps from a closed position into an open position and vice versa, wherein the closure flaps in the closed position substantially close the air inlet in terms of flow and in the open position substantially release the air inlet in terms of flow, and wherein, in the closed position, the second closure flap abuts a closed position stop and, in the open position, the third closure flap abuts an open position stop. In this instance, the terms "close in terms of flow" and "release in terms of flow" are intended to be understood to mean that the passage of a flow is substantially permitted or prevented so that elements located downstream of the closure unit in the flow direction can be selectively supplied with a flow. In particular, the term "close in terms of flow" does not imply a gas-tight closure.

The closure unit which can alternatively be referred to as an air inlet closure device comprises only one drive unit by means of which all three closure flaps, which are preferably so-called closure plates, are movable. It is therefore constructed in a particularly simple manner. Therefore, such a closure unit is also lightweight. As a result of the small number of components, defects and malfunctions, in particular defective closure flaps, can further be identified in a rapid and simple manner. In the closed position and in the open position, the closure flaps additionally assume defined positions. This also enables simple and rapid fault identification.

The coupling members may, for example, comprise toothed wheels, levers, coupling rods, belt drives or chain drives. A large range of known technologies for rotatably coupling two closure flaps can thus be used.

The drive unit preferably comprises an electric motor.

The first closure flap, the second closure flap, the third closure flap, the first coupling member, the second coupling member, the closed position stop and/or the open position stop may be produced from a plastics material.

Advantageously, the closure unit does not comprise any additional closed position stop and/or any additional open position stop. In other words, the closure unit comprises only a single closed position stop and only a single open position stop. Consequently, the closure unit is particularly simple in terms of construction and consequently can also be produced in a cost-effective manner. Furthermore, malfunctions can thus be identified in a simple and rapid manner since in any position, that is to say, both in the closed position and in the open position, only the abutment of a single closure flap against the associated stop has to be verified. If this is the case, it can be assumed that the closure unit is functioning correctly. If this is not the case, there is a malfunction.

According to an embodiment, the first coupling member and/or the second coupling member is/are arranged in an extent direction of the first closure flap at an end of the first closure flap opposite the drive unit. The extent direction of the first closure flap corresponds in this instance to the rotation axis thereof, that is to say, the first rotation axis. The first closure flap is thus coupled at one end to the drive unit and at an opposing end operationally connected via the first and/or second coupling member to the other two closure flaps. Substantially the whole first closure flap is thus located between the drive unit and the first and/or second coupling member. Consequently, a flow which passes the closure unit is impaired only to an extremely small extent by the components of the closure unit. In particular, the flow in the context of an element which is located downstream of the closure element is not influenced in a negative manner, for example, heavily swirled. In addition, this arrangement enables during the actuation of the closure unit a function verification of the first closure flap over the entire extent thereof. In particular, a breakage of the first closure flap or the loss thereof can thus be detected. If the second closure flap reaches the closed position stop and/or the third closure flap reaches the open position stop in the predetermined manner, it can be assumed that the first closure flap is functioning correctly. If the reverse is true, there is a defect.

The closed position stop may be arranged in an extent direction of the second closure flap at an end of the second closure flap opposite the first coupling member. The second closure flap consequently extends substantially in its entirety between the first coupling member and the closed position stop. As already explained with reference to the first closure flap, this arrangement enables a function verification of the second closure flap over the entire extent thereof, whilst the closure unit is moved between the stops thereof. In this instance, the function verification particularly involves a verification for fracture and/or loss of the second closure flap. If in this context the closed position stop is reached in the predetermined manner, it can be assumed that both the first closure flap and the second closure flap are functional. If a defect occurs in the region of the second closure flap, the closed position stop is not reached. Consequently, defects and malfunctions can be identified in a particularly rapid and simple manner.

The open position stop may be arranged in an extent direction of the third closure flap at an end of the third closure flap opposite the second coupling member. As with the second closure flap, substantially the entire third closure flap is now located between the second coupling member and the open position stop. If this stop is reached when the closure unit is activated in the predetermined manner, it can be assumed that the first closure flap is functional and the third closure flap is intact. If there is a defect in the region of the third closure flap, in particular if it is broken or lost, the open position stop is not reached. Consequently, malfunctions and defects of the closure unit can be identified in a particularly simple and rapid manner.

The open position stop and/or the closed position stop is/are preferably provided on a frame of the closure unit.

In a variant, the first rotation axis, the second rotation axis and the third rotation axis extend substantially parallel and/or the second rotation axis and the third rotation axis have substantially the same spacing from the first rotation axis in terms of value. Consequently, the first, the second and the third closure flap extend substantially parallel. In the event that the spacings from the first rotation axis are substantially the same in terms of value, at least the second and the third closure flap may have substantially identical dimensions. Preferably, all the closure flaps are substantially identical in terms of the dimensions thereof. This promotes a simple and cost-effective production.

According to an alternative, the air inlet is constructed as an air inlet grid and a grid cell of the air inlet grid is associated with each of the closure flaps. The air inlet grid may also colloquially be referred to as a radiator grille. In this instance, the term grid is intended to be understood in a broad sense so that two cells which are adjacent to each other can also be referred to as a grid. In this instance, the closure flaps are therefore arranged in such a manner that a closure flap can release or close an associated grid cell in each case. Such closure units are particularly simple and robust in terms of construction.

The object is further achieved by a method of the type mentioned in the introduction, by means of which defective, in particular broken and/or lost, closure flaps of a closure unit according to the invention can be detected. The method comprises the following steps:

a) activating the closure unit in the direction of the closed position and verifying whether the second closure flap runs against the closed position stop, and b) activating the closure unit in the direction of the open position and verifying whether the third closure flap runs against the open position stop.

The activation of the closure unit may in this instance be carried out in a time-controlled or angle-controlled manner. In the first instance, the closure unit, more specifically the drive unit thereof, is activated for a specific time. In the second case, it is adjusted about a specific rotation angle. Combinations of these two operating modes are also possible. As already explained, it is only possible to run against the closed position stop when the drive unit, the first closure flap, the first coupling member and the second closure flap are functional. It is only possible to run against the open position stop when the drive unit, the first closure flap, the second coupling member and the third closure flap are functional. If the second closure flap does not run against the closed position stop and/or the third closure flap does not run against the open position stop, a defective closure flap is detected. Consequently, there is provided a simple and reliable method, by means of which defects and malfunctions of the closure unit can be identified. In addition, such a method can be carried out during ongoing operation of the closure unit, for example, with each start-up, that is to say, for example, when starting a motor vehicle which is provided with such a closure unit. A visual inspection can be dispensed with in this case. A workshop environment is also not required.

Preferably, a defective, in particular broken or lost, second closure flap is detected by the second closure flap not running against the closed position stop when the closure unit is activated in the direction of the closed position. A prerequisite for this is that the open position stop is reached during activation in the direction of the closed position. Otherwise, the defect can only be limited to the first and the second closure flap. In spite of the simple construction of the closure unit, it is consequently possible in a simple manner to make relatively precise indications relating to defective closure flaps.

Advantageously, a defective, in particular broken or lost, third closure flap is detected by the third closure flap not running against the open position stop when the closure unit is activated in the direction of the open position. This is the case if the closed position stop is reached when the closure unit is activated in the direction of the closed position. Otherwise, a defective first and/or third closure flap is present. Consequently, using the method, error statements which are specific to one or two closure flaps can be made in a rapid and simple manner.

According to an embodiment, a defective, in particular broken or lost, first closure flap is detected by the third closure flap not running against the open position stop when the closure unit is activated in the direction of the open position and by the second closure flap not running against the closed position stop when the closure unit is activated in the direction of the closed position. In this instance, it is assumed that, if at all, only a single closure flap has a defect. This substantially corresponds to reality. Purely theoretically, the detection result mentioned can naturally also be brought about by two defective closure flaps, wherein it is not significant which two closure flaps are defective. The same applies if all three closure flaps are defective. As already mentioned in relation to the second and third closure flap, such an error detection is carried out in a rapid, simple and reliable manner.

In particular, no defective, in particular broken or lost, closure flap is detected if the third closure flap runs against the open position stop when the closure unit is activated in the direction of the open position and if the second closure flap runs against the closed position stop when the closure unit is activated in the direction of the closed position. This behaviour corresponds to the desired function of the closure unit.

Furthermore, the object is achieved with a motor vehicle of the type mentioned in the introduction, wherein at least one of the air inlets is provided with a closure unit according to the invention. Such a motor vehicle has the advantages which generally arise in connection with the use of a closure unit. In particular, such a motor vehicle additionally has the advantages which result from the use of a closure unit according to the invention. In particular in this instance, defective closure flaps can be identified in a rapid and simple manner. In addition, the simple structure of the closure unit also contributes to a simple structure of the motor vehicle. The same applies to the weight, wherein a low overall weight of the motor vehicle is promoted by the low weight of the closure unit.

In an embodiment, the motor vehicle comprises two closure units, wherein the closure units are arranged beside each other in a substantially common extent direction of the first closure flaps in such a manner that the drive units face each other. The drive units are thus located substantially between the first closure flaps in each case. The two closure units may be associated with a common air inlet, wherein each closure unit can only partially close or release the air inlet in terms of flow. Alternatively, the motor vehicle may comprise two air inlets, wherein one of the closure units is associated with each air inlet.

Alternatively, the motor vehicle may comprise two closure units, wherein the closure units are arranged beside each other in a substantially common extent direction of the first closure flaps in such a manner that the drive units face away from each other. The drive units are thus located at the side of the closure unit with which they are associated and which faces away from the other closure unit in each case. In contrast to the above-mentioned alternative, the drive units are thus located at the outer side. The motor vehicle may again comprise two air inlets, wherein each of the closure units is associated with one of the air inlets. It is also possible for the closure units to be associated with a common air inlet and to be able to partially close or release it, respectively.

Figure 2:
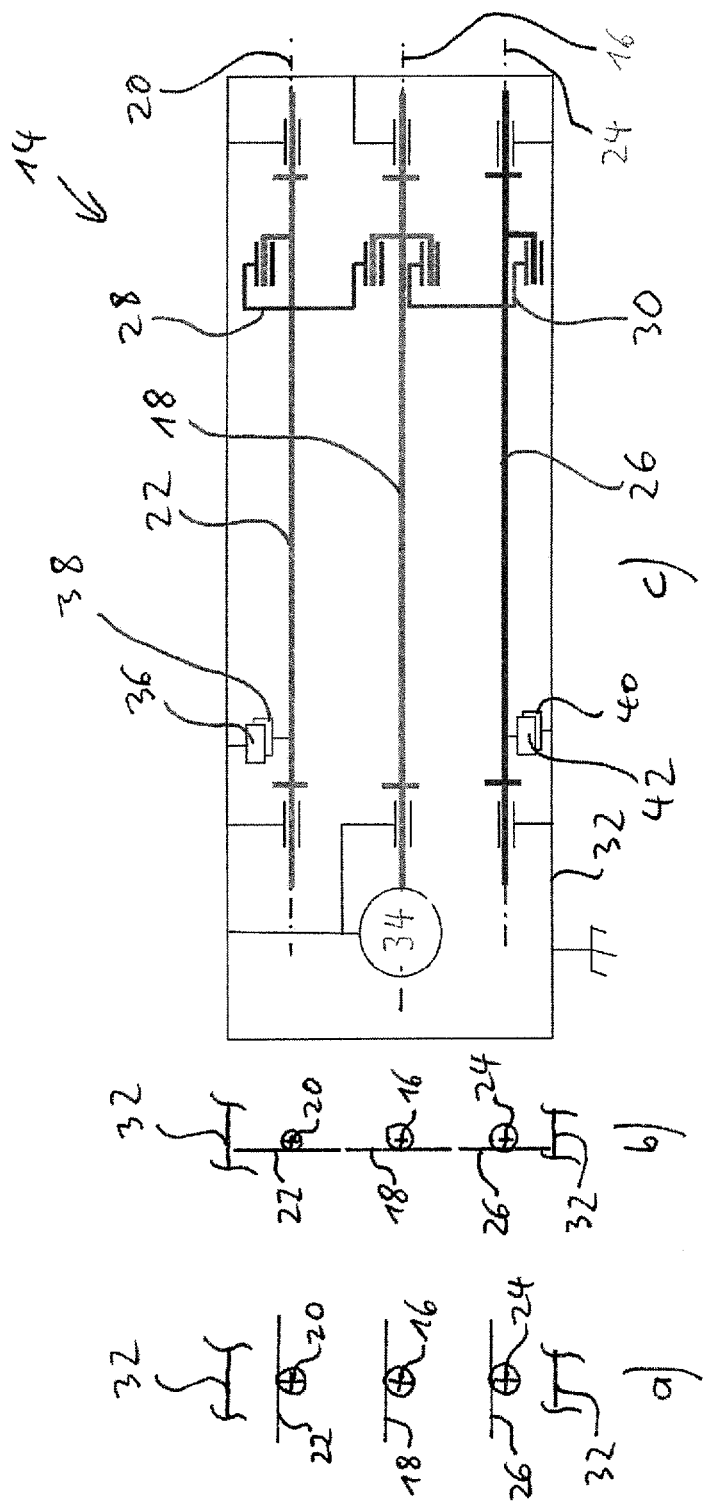
Figure 3:
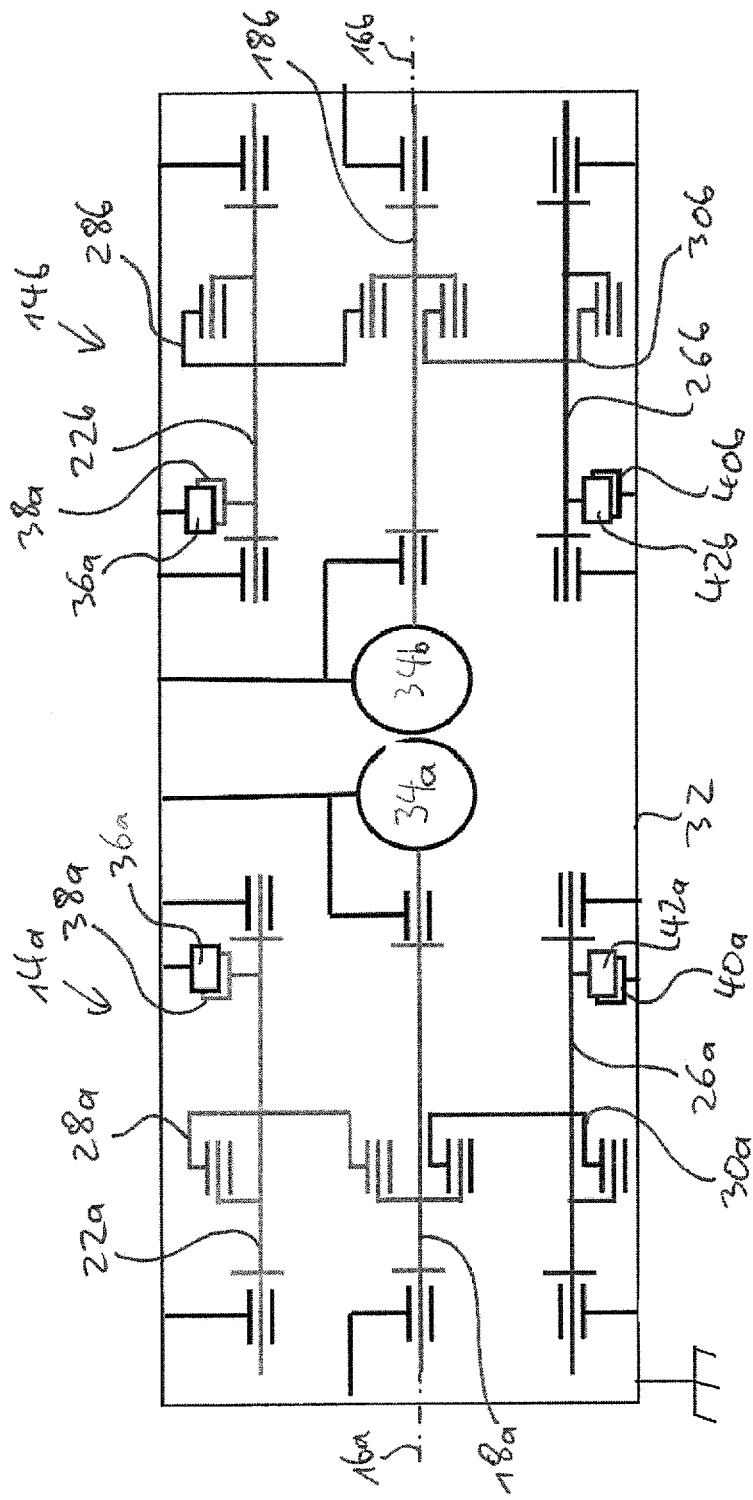
Figure 4:
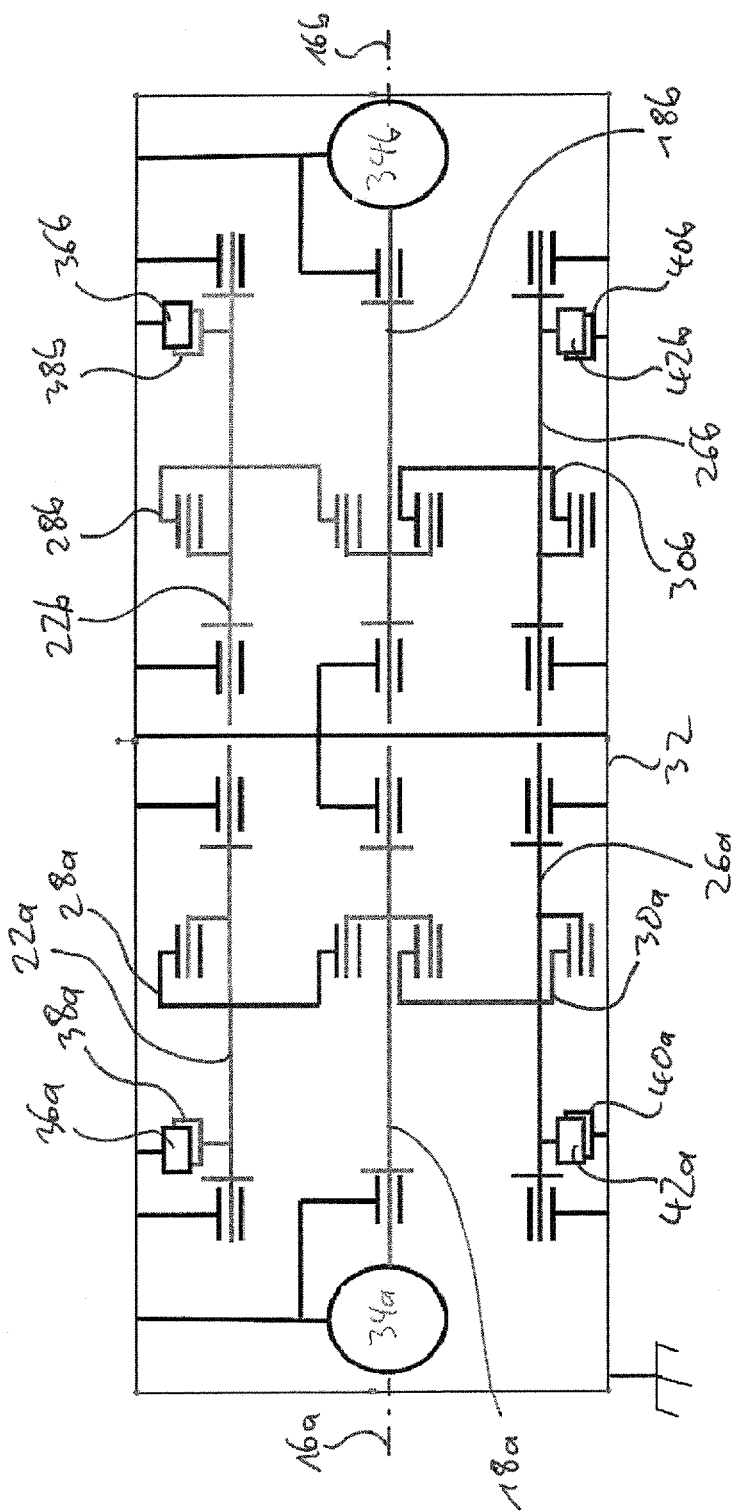

The invention is explained below with reference to different embodiments which are shown in the appended drawings, in which:

FIG. 1 is a schematic front view of a motor vehicle according to the invention with a closure unit according to the invention and a motor vehicle according to the invention with two closure units according to the invention, FIG. 2 shows a closure unit according to the invention as a kinematic functional diagram, wherein by means of the closure unit according to the invention a method according to the invention for detecting defective closure flaps can be carried out, FIG. 3 shows a first arrangement comprising two closure units according to the invention according to FIG. 2 as a kinematic functional diagram, and FIG. 4 shows a second arrangement comprising two closure units according to the invention according to FIG. 2 as a kinematic functional diagram.

FIG. 1*a*) shows a motor vehicle 10 having an air inlet 12 which is arranged in a front region of the motor vehicle 10 and which can also be referred to as a radiator grille. The air inlet is provided with a closure unit 14.

A variant of the motor vehicle 10 from FIG. 1*a*) is illustrated in FIG. 1*b*). In this instance, the air inlet 12 is provided with two closure units 14. In this instance, one of the closure units 14 is associated with a region 12*a* of the air inlet 12 and the other closure unit 14 is associated with a region 12*b*.

The closure unit 14 can be seen in detail in FIG. 2.

It comprises a first closure flap 18 which can be pivoted about a first rotation axis 16, a second closure flap 22 which can be pivoted about a second rotation axis 20 and a third closure flap 26 which can be pivoted about a third rotation axis 24.

In this case, the first closure flap 18 and the second closure flap 22 are kinematically coupled by means of a first coupling member 28. Furthermore, the first closure flap 18 is kinematically coupled by means of a second coupling member 30 to the third closure flap 26.

All the closure flaps 18, 22, 26 are supported in a frame 32 of the closure unit 14.

In the assembled state, this frame 32 is securely connected to components of the motor vehicle 10 which form the air inlet 12 which is associated with the closure unit 14.

The coupling members 28, 30 are each supported only on the associated closure flaps 18, 22, 26.

The closure unit 14 also comprises a drive unit 34 which is drivingly coupled to the first closure flap 18.

The drive unit 34 is further constructed to move the closure flaps 18, 22, 26 from a closed position into an open position and vice versa. The open position is illustrated in this instance in FIG. 2*a*) which is a side view of FIG. 2*c*). The closed position can be seen in FIG. 2*b*) which is also a side view of FIG. 2*c*).

In the closed position (cf. FIG. 2*b*)), the closure flaps 18, 22, 26 substantially close the air inlet 12 in terms of flow. In the open position (cf. FIG. 2*a*)), they release it in terms of flow.

In the closed position, the second closure flap 22 abuts a closed position stop 36 which is arranged on the frame 32. To this end, in the embodiment shown there is provided on the second closure flap 22 a stop counter-face 38 which may be formed integrally on the second closure flap 22.

In the open position, the third closure flap 26 abuts an open position stop 40 which is also arranged on the frame 32. To this end, the third closure flap 26 has a stop counter-face 42. This may also be formed integrally on the third closure flap 26.

In the illustration according to FIG. 2c), the closed position stop 36, the open position stop 40 and the associated stop counter-faces 38, 42 in each case for the sake of ease of identification are illustrated in a state rotated in the drawing plane.

The closure unit 14 does not have any additional stops, in particular closed position stops and/or open position stops.

As can be seen in particular with reference to FIG. 2c), both the first coupling member 28 and the second coupling member 30 in an extent direction of the first closure flap 18, which in this instance corresponds to the first rotation axis 16, are arranged at an end of the first closure flap 18 opposite the drive unit 34.

In an extent direction of the second closure flap 22 which corresponds to the second rotation axis 20, the closed position stop 36 and the associated stop counter-face 38 are arranged at an end of the second closure flap 22 opposite the first coupling member 28.

The same applies to the open position stop 40. This stop and the associated stop counter-face 42 are, in an extent direction of the third closure flap 26 which corresponds to the third rotation axis 24, arranged at an end of the third closure flap 26 opposite the second coupling member 30.

The coupling members 28, 30 and the stop counter-faces 38, 42, the open position stop 40 and the closed position stop 36 are thus arranged in each case in an outer region of the associated closure flap 18, 22, 26.

In the embodiment illustrated, the coupling members 28, 30, the open position stop 40, the closed position stop 36 and the stop counter-faces 38, 42 are offset inwards relative to the bearing of the associated closure flap 18, 22, 26. Alternatively, however, the above-mentioned elements could also be offset in an outward direction from the bearing of the closure flap 18, 22, 26.

In the embodiment illustrated, the first rotation axis 16, the second rotation axis 20 and the third rotation axis 24 additionally extend substantially parallel. In addition, the second rotation axis 20 and the third rotation axis 24 substantially have in each case the same amount of spacing from the first rotation axis 16 in terms of value.

In the event that the air inlet 12 is constructed as an air inlet grid (not illustrated), a grid cell of the air inlet grid may be associated with each of the closure flaps 18, 22, 26.

This means that there can be closed and released in terms of flow by means of the first closure flap 18 a first grid cell, with the second closure flap 22 a second grid cell and by means of the third closure flap 26 a third grid cell.

FIG. 3 illustrates a first arrangement comprising two closure units 14. In order to distinguish the two closure units 14, the associated reference numerals are provided with the suffixes a and b.

Both closure units 14a, 14b are arranged in a common frame 32, wherein they are arranged beside each other in a substantially common extent direction of the first closure flaps 18a, 18b in such a manner that the drive units 34a, 34b face each other. Again, the extent direction of the first closure flaps 18a, 18b substantially corresponds to the first rotation axes 16a, 16b.

An arrangement according to FIG. 3 may, for example, be used in a motor vehicle 10 according to FIG. 1b). The closure unit 14a is then associated with the region 12a of the air inlet 12 and the closure unit 14b is associated with the region 12b.

The two closure units 14a, 14b may be operated independently of each other.

It is also possible to provide only one of the regions 12a, 12b with a closure unit 14a, 14b.

Since the closure units 14a, 14b correspond to the closure unit from FIG. 2 in terms of their structure, reference may be made to the above statements in this regard.

FIG. 4 shows an alternative to the arrangement illustrated in FIG. 3 of two closure units 14a, 14b.

The closure units 14a, 14b are now arranged beside each other in the substantially common extent direction of the first closure flaps 18a, 18b in such a manner that the drive units 34a, 34b face away from each other.

The closure units 14, 14a, 14b are configured in such a manner that they enable a method for detecting defective, in particular broken and/or lost, closure flaps 18, 22, 26 to be carried out. For reasons of clarity, reference numerals without suffixes are used again (see in particular FIG. 2).

To this end, the closure unit 14 is moved in the direction of the closed position (cf. FIG. 2b)). In this case, it is verified whether the second closure flap 22, more specifically the stop counter-face 38, runs against the closed position stop 36.

Furthermore, the closure unit 14 is activated in the direction of the open position (cf. FIG. 2a)) and it is verified whether the third closure flap 26, more specifically the stop counter-face 42, runs against the open position stop 40.

If, during such an activation cycle, which is also referred to as a verification cycle below, both the third closure flap 26 runs against the open position stop 40 and the second closure flap 22 runs against the closed position stop 36, a defective, in particular broken or lost, closure flap 18, 22, 26 is not detected. The closure unit 14 is thus functional at least with regard to the closure flaps 18, 22, 26.

This conclusion results from the structure of the closure unit 14 and the force and torque flows which are connected therewith within the closure unit 14.

Based on the drive unit 34 which is drivingly coupled only to the first closure flap 18, the first closure flap 18 is first driven. In the event that it has no defect, the first closure flap 18 transmits the drive torque or the drive force of the drive unit 34 to the two coupling members 28, 30.

Since the drive unit 34 and the coupling members 28, 30 are arranged at opposing ends of the first closure flap 18, substantially the entire first closure flap 18 extends between the drive unit 34 and the coupling members 28, 20. Substantially all locations of the first closure flap 18 on which a defect may potentially occur, in particular a breakage or a loss of the first closure flap 18, are consequently also located between these two elements.

The first coupling member 28 is additionally kinematically coupled to the second closure flap 22 and transmits the drive torque or the drive force originating from the drive unit 34 to the second closure flap 22.

If the second closure flap does not have any defect, it, more specifically the stop counter-face 38, runs against the closed position stop 36.

The closed position stop 36 and the first coupling member are again arranged at opposing ends of the second closure flap 22 so that substantially the entire second closure flap 22 extends between these elements. Consequently, the locations of potential defects are also located substantially between these elements.

The same applies to the third closure flap 26 which is driven by means of the second coupling member 30 and in the open position runs against the open position stop 40.

It may be the case that, when the closure unit 14 is activated in the direction of the closed position, the second closure flap 22 does not run against the closed position stop 36. More specifically, the stop counter-face 38 does not run against the closed position stop 36. In the remainder of the verification cycle, however, when the closure unit 14 is activated in the direction of the open position, the open position stop 40 is reached by the third closure flap 26, more specifically by the stop counter-face 42.

In such a case, a defective, in particular broken or lost, second closure flap 22 is detected.

A defect of the first closure flap 18 and the third closure flap 26 may be reliably excluded since the open position stop 40 is reached.

The reverse situation may also arise, that is to say, when the closure unit 14 is activated in the direction of the open position, the open position stop 40 is not reached by the third closure flap 26, more specifically not by the stop counter-face 42. In the context of the same verification cycle, however, when activated in the direction of the closed position, the closed position stop 36 is reached by the second closure flap 22.

A defective, in particular broken or lost, third closure flap 26 is then detected. Since the closed position stop is reached, a defect on the first closure flap 18 and the second closure flap 22 can be reliably excluded.

If, during a verification cycle when the closure unit 14 is activated in the direction of the open position, the open position stop 40 is not reached by the third closure flap 26 just as, when the closure unit 14 is activated in the direction of the closed position, the closed position stop 36 is not reached by the second closure flap 22, a defective, in particular broken or lost, first closure flap 18 is detected.

An alternative cause for the last case mentioned is that both the second closure flap 22 and the third closure flap 26 are defective, but at the same time the first closure flap 18 is not defective.

Of course, in addition to the first closure flap 18, the second closure flap 22 or the third closure flap 26 may also be defective.

All three closure flaps 18, 22, 26 may also be defective.

During the detection of a defective first closure flap 18, therefore, these alternative causes have to be taken into consideration. However, it should be assumed that cases in which only one of the closure flaps 18, 22, 26 is defective, are significantly more frequent than cases in which two or more of the closure flaps 18, 22, 26 have a defect. The alternative causes are thus peripheral phenomena.

The invention claimed is:

1. A closure unit for an air inlet of a motor vehicle, comprising:
    a first closure flap which can be pivoted about a first rotation axis;
    a second closure flap which can be pivoted about a second rotation axis;
    a third closure flap which can be pivoted about a third rotation axis;
    a first coupling member via which the first closure flap and the second closure flap are kinematically coupled;
    a second coupling member via which the first closure flap and the third closure flap are kinematically coupled; and
    a drive unit which is drivingly coupled to the first closure flap and which is constructed to move the closure flaps from a closed position into an open position and vice versa,
    wherein the closure flaps in the closed position substantially close the air inlet in terms of flow and in the open position substantially release the air inlet in terms of flow, and
    wherein:
        in the closed position, a verification that the second closure flap abuts a closed position stop is performed to detect defective, broken and/or lost, closure flaps, and
        in the open position, a verification that the third closure flap abuts an open position stop is performed to detect defective, broken and/or lost, closure flaps.

2. The closure unit according to claim 1, wherein the closure unit does not comprise any additional closed position stop and/or any additional open position stop.

3. The closure unit according to claim 1, wherein the first coupling member and/or the second coupling member is/are arranged in an extent direction of the first closure flap at an end of the first closure flap opposite the drive unit.

4. The closure unit according to claim 1, wherein the closed position stop is arranged in an extent direction of the second closure flap at an end of the second closure flap opposite the first coupling member.

5. The closure unit according to claim 1, wherein the open position stop is arranged in an extent direction of the third closure flap at an end of the third closure flap opposite the second coupling member.

6. The closure unit according to claim 1, wherein the first rotation axis, the second rotation axis and the third rotation axis extend substantially parallel and/or the second rotation axis and the third rotation axis have substantially the same spacing from the first rotation axis in terms of value.

7. The closure unit according to claim 1, wherein the air inlet is constructed as an air inlet grid and a grid cell of the air inlet grid is associated with each of the closure flaps.

8. A method for detecting defective, broken and/or lost, closure flaps of a closure unit for an air inlet of a motor vehicle, the method comprising:
    activating the closure unit in the direction of a closed position, the closure unit comprising: a first closure flap which can be pivoted about a first rotation axis, a second closure flap which can be pivoted about a second rotation axis, a third closure flap which can be pivoted about a third rotation axis, a first coupling member via which the first closure flap and the second closure flap are kinematically coupled, a second coupling member via which the first closure flap and the third closure flap are kinematically coupled, and a drive unit which is drivingly coupled to the first closure flap and which is constructed to move the closure flaps from a closed position into an open position and vice versa;
    verifying whether the second closure flap runs against the closed position stop,
    wherein the closure flaps in the closed position substantially close the air inlet in terms of flow and in the open position substantially release the air inlet in terms of flow, and
    wherein, in the closed position, the second closure flap abuts a closed position stop and, in the open position, the third closure flap abuts an open position stop;
    activating the closure unit in the direction of the open position; and
    verifying whether the third closure flap runs against the open position stop.

9. The method according to claim 8, wherein a defective, in particular broken or lost, second closure flap is detected by the second closure flap not running against the closed position stop when the closure unit is activated in the direction of the closed position.

10. The method according to claim 8, wherein a defective, in particular broken or lost, third closure flap is detected by the third closure flap not running against the open position stop when the closure unit is activated in the direction of the open position.

11. The method according to claim 8, wherein a defective, broken or lost, first closure flap is detected by the third closure flap not running against the open position stop when the closure unit is activated in the direction of the open position and by the second closure flap not running against the closed position stop when the closure unit is activated in the direction of the closed position.

12. The method according to claim 8, wherein no defective, broken or lost, closure flap is detected when the third closure flap runs against the open position stop when the closure unit is activated in the direction of the open position and if the second closure flap runs against the closed position stop when the closure unit is activated in the direction of the closed position.

13. A motor vehicle, comprising
one or more air inlets, wherein at least one of the air inlets is provided with a closure unit,
the closure unit comprising:
a first closure flap which can be pivoted about a first rotation axis;
a second closure flap which can be pivoted about a second rotation axis;
a third closure flap which can be pivoted about a third rotation axis;
a first coupling member via which the first closure flap and the second closure flap are kinematically coupled;
a second coupling member via which the first closure flap and the third closure flap are kinematically coupled; and
a drive unit which is drivingly coupled to the first closure flap and which is constructed to move the closure flaps from a closed position into an open position and vice versa,
wherein the closure flaps in the closed position substantially close the air inlet in terms of flow and in the open position substantially release the air inlet in terms of flow, and
wherein:
in the closed position, a verification that the second closure flap abuts a closed position stop is performed to detect defective, broken and/or lost, closure flaps, and
in the open position, a verification that the third closure flap abuts an open position stop is performed to detect defective, broken and/or lost, closure flaps.

14. The motor vehicle according to claim 13, further comprising two closure units, wherein the closure units are arranged beside each other in a substantially common extent direction of the first closure flaps in such a manner that the drive units face each other.

15. The motor vehicle according to claim 13, further comprising two closure units, wherein the closure units are arranged beside each other in a substantially common extent direction of the first closure flaps beside each other in such a manner that the drive units face away from each other.

* * * * *